Figure 1:
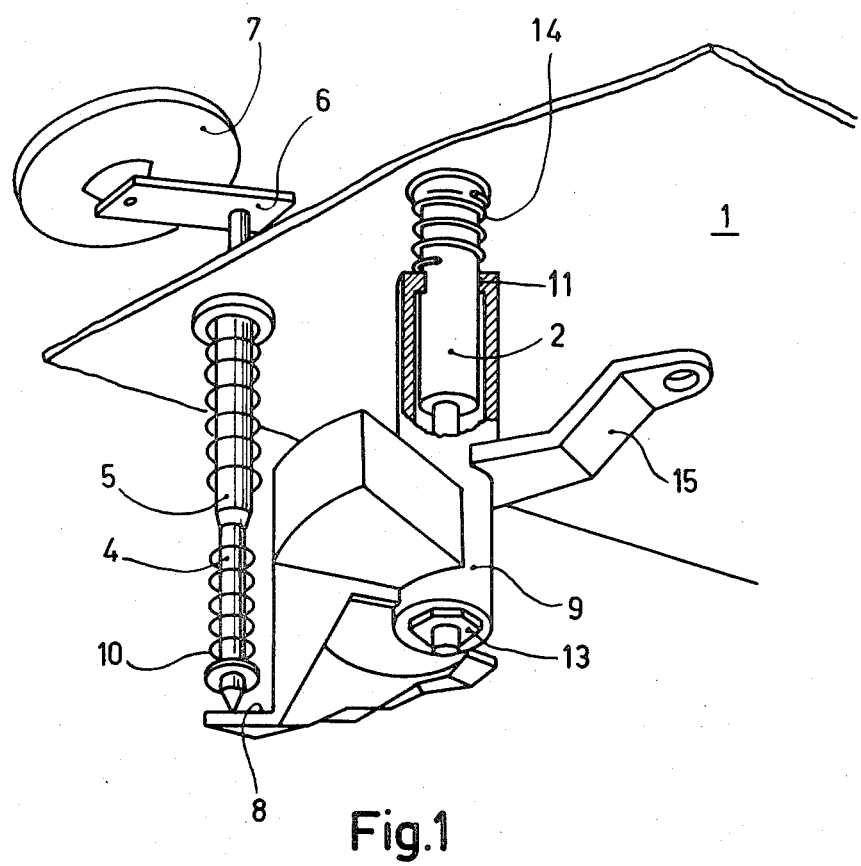

United States Patent [19]
Eisemann

[11] 3,818,772
[45] June 25, 1974

[54] ARRANGEMENT IN A RECORD PLAYER FOR ACCURATELY ADJUSTING THE HEIGHT OF A FRICTION WHEEL

[75] Inventor: Kurt Eisemann, Berlin, Germany

[73] Assignee: U.S. Philips Corporation, New York, N.Y.

[22] Filed: Sept. 11, 1972

[21] Appl. No.: 287,967

[30] Foreign Application Priority Data
Sept. 15, 1971 Germany............................ 21461223

[52] U.S. Cl.................................... 74/107, 74/190
[51] Int. Cl............................................. F16h 27/44
[58] Field of Search............................. 74/107, 190

[56] References Cited
UNITED STATES PATENTS

| | | | |
|---|---|---|---|
| 2,991,660 | 7/1961 | Mihaila | 74/190 |
| 3,138,031 | 6/1964 | Brualdi | 74/190 |
| 3,546,954 | 12/1970 | Ustin | 74/107 |

Primary Examiner—Samuel Scott
Assistant Examiner—Wesley S. Ratliff, Jr.
Attorney, Agent, or Firm—Frank R. Trifari

[57] ABSTRACT

The present invention is directed to a record player having a chassis, a turntable carried on the chassis and a stepped drive shaft driven by a friction wheel. The contact position of the wheel with the shaft determines the different speeds for operating the turntable. Mechanism is provided for accurately adjusting the vertical position of the friction wheel with respect to the steps of the drive shaft. A bolt having a threaded end is carried on the chassis and a shift element is displaceably carried on the bolt for accurately adjusting the height of the friction wheel. The shift element has a step cam surface and the wheel is supported by a support cooperating with the cam surface so that as the shift element is rotated the height of the friction wheel will vary so as to change the operating speeds of the turntable. A nut is carried on a threaded end of the bolt so as to accurately determine the vertical position of the shift element for fine adjustment and a spring urges the shift element into engagement with the nut.

3 Claims, 2 Drawing Figures

ARRANGEMENT IN A RECORD PLAYER FOR ACCURATELY ADJUSTING THE HEIGHT OF A FRICTION WHEEL

The invention relates to an arrangement in a record player for accurately adjusting the height of a friction wheel relative to a stepped drive shaft which drives the turntable by means of the friction wheel, a shift element being provided by means of which the friction wheel may be vertically shifted for changing the speed of the turntable in steps in that the friction wheel support is urged against a stepped path of the shift element.

Friction transmissions in record players must be designed so that the position of the friction wheel relative to the stepped drive shaft may readily be corrected during assembly of the record players or during repairs. The contact of the lateral surface of the friction wheel with the adjacent vertical surface of the transition of that step of the drive shaft to which the friction wheel is actually coupled by friction relative to the next higher step or the partial contact of the contact surface with the edge of the next lower step will inevitably result in speed deviations. The small heights of the steps of the drive shaft which are used in practice for constructional reasons and the minimum thickness of the friction wheel required to obtain satisfactory friction coupling consequently require accurate adjustment of the friction wheel in a position in which the engaging surfaces always lie at the middle of the respective step height.

With respect to the latter requirements, in record players not provided with an arrangement for accurate vertical adjustment time consuming adjusting methods have to be used which consist in the bending of levers and the like and require good accessibility of the friction wheel itself.

U.S. Pat. No. 2,991,660 describes a record player drive which is provided with a friction transmission shift mechanism which comprises a friction wheel support arranged at one end of a two-armed lever and a pin secured to the record player for pivotably and axially displaceably mounting the lever, whilst at the end of the other lever arm a screw is provided which is arranged in the lever arm by means of screw thread and the tapering unthreaded end of which bears on a stepped path of an operating element under the influence of a compression spring surrounding the pin for vertically changing the position of the friction wheel in steps. The screw further serves to laterally support the two-armed lever, which embraces the pin with a required amount of clearance, and has to allow accurate vertical adjustment of the friction wheel. Turning the screw indeed enables the position of the friction wheel relative to the steps of the drive shaft to be corrected, however, owing to the aforementioned one-sided support of the two-armed lever, turning the screw inevitably involves errors in the alignment of the friction wheel shaft relative to the drive shaft. As a result the friction wheel no longer extends exactly horizontally, which in transmitting motion to the turntable gives rise to speed variations and to deformations of the friction wheel.

It is an object of the present invention to provide an arrangement for fine vertical adjustment which is readily accessible and permits fine adjustment in which the horizontal position of the friction wheel remains unchanged.

According to the invention this is achieved in that the shifting element is displaceable along a bolt in the direction of the vertical adjustment of the friction wheel and is urged by a spring against a nut provided on the end of the bolt.

To prevent the nut which serves for vertical fine adjustment from being accidentally turned during the operation of the shifting mechanism, an embodiment of the invention is characterized in that the shift element is formed with a hexagonal recess in its lower surface for receiving the nut.

According to an embodiment of the invention the possibility of vertical fine adjustment from the upper surface of the chassis of the record player is obtained in that the bolt is mounted for rotation in the chassis of the record player and is provided with a protection against dropping off of the nut.

The advantages provided by the invention particularly consist in the fact that the guidance of the shift element on the bolt avoids the occurrence of errors in alignment of the shaft of the friction wheel and the drive shaft. Thus speed deviations and friction-wheel deformations due to non-alignment are avoided. In addition, the arrangement for fine adjustment according to the invention owing to its ready accessibility and the simple turning of a nut enables the contact surface of the friction wheel to be rapidly and accurately adjusted in a position relative to the stepped drive shaft in which the contacting surfaces lay at the middle of the step heights. By means of a commercially available stroboscopic disc to be placed on the turntable of the record player, in the said embodiment vertical adjustment from the upper surface of the chassis of the record player may readily be performed by means of the bolt, because both when the lateral surface of the friction wheel engages the adjacent vertical surface of the transition of the step of the drive shaft to which the friction wheel is actually coupled and when the contacting surface partially engages the edge of the next lower stage speed deviations may be visually observed.

An embodiment of the invention will now be described, by way of example, with reference to the accompanying diagrammatic drawings, in which:

FIG. 1 schematically shows the shift mechanism and

Figure 2:
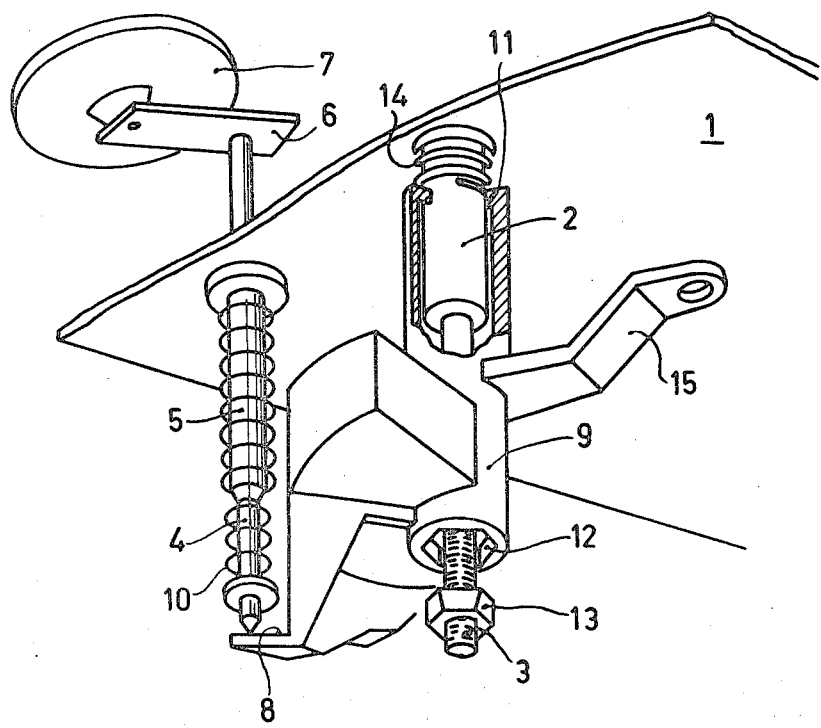

FIG. 2 schematically shows the shift mechanism of FIG. 1 with the shift element raised for vertical adjustment.

The part of a chassis 1 of a record player which is shown in the Figures at its lower surface carries a pin 2 which is rigidly secured to the chassis and terminates in a portion which has a reduced diameter and is provided with screw thread 3 at its end. A shaft 4 which is rotatable and axially movable passes with a certain amount of clearance through the chassis and is guided in a sleeve 5 rigidly secured to the chassis. The end of the shaft which projects above the chassis carries an arm 6 on which a friction wheel 7 is mounted. Between the lower tapering end of the shaft 4 and the steps of a stepped path 8 of a shift element 9, which will be described more fully hereinafter, there is established a pressure coupling which is maintained at any height of the friction wheel by a compression spring 10 which surrounds the shaft and one end of which bears against the lower surface of the chassis and the other end of which bears against a ring secured to the shaft. The basically cylindrical shift element 9, which at the upper end has a re-entrant rim 11 and at the lower end is formed with a hexagonal recess 12, surrounds the pin 2, with a certain amount clearance between the pin and the ring, so as to be rotatable about, and axially displaceable along, the pin and is supported by a nut 13 screwed on the screw thread 3 of the pin. The recess 12 receives the nut, thereby preventing accidental rotation thereof. To prevent the shift element from slipping off over the nut the distance between the sides of the hexagon of the recess is larger than the inner diameter of the cylindrical basic body. A compression spring 14 which surrounds the pin between the lower surface of the chassis of the record player and the upper ring 11 of the shift element ensures a tight engagement between the element and the nut. Along its circumference the shift element carries the aforementioned stepped path 8 and a shift arm 15. By coupling means (not shown) the shift arm is connected to an operating element for changing the speed in steps by partial pivoting movements of the shift element.

In order to make a vertical fine adjustment the shift element is raised against the force of the spring 14 (FIG. 2). As a result the nut 13 is freely accessible and may be turned for accurate adjustment of the position of the friction wheel. When the shift element is subsequently lowered the recess 12 embraces the nut, so that it again assumes the function of a bearing for the shift element.

What is claimed is:

1. In a record player having a chassis, a turntable carried on the chassis, and a stepped drive shaft driven by friction contact with a friction wheel for driving said turntable at different operating speeds, a mechanism for accurately adjusting the vertical position of said friction wheel with respect to the steps of said stepped drive shaft so as to change the operating speed of said turntable, said mechanism comprising a bolt having a threaded end rotatably carried on said chassis, a shift element supported by said bolt for axial displacement thereon in the direction of vertical adjustment of said friction wheel, said shift element having a stepped cam surface, a vertical support carrying at one end thereof said friction wheel and the other end thereof cooperating with said cam surface, means for urging said vertical support against said cam surface so as to maintain said cooperation, so that upon movement of said cam surface of said shift element said vertical support will be displaced so as to change the position of contact between said stepped drive shaft and said friction wheel to change the operating speed of said turntable, a nut carried on the threaded end of said bolt for accurately determining the vertical position of said shift element, and a spring engaging said shift element so as to urge said element against said nut.

2. In the record player according to claim 1 wherein said nut is hexagonal, and further comprising a hexagonal recess in the lower surface of said shift element for receiving said nut.

3. In the record player according to claim 2 further comprising means carried by said bolt for preventing removal of said nut.

* * * * *

PO-1050
(5/69)

UNITED STATES PATENT OFFICE
CERTIFICATE OF CORRECTION

Patent No. 3818772          Dated June 25, 1974

Inventor(s) KURT EISEMANN

It is certified that error appears in the above-identified patent and that said Letters Patent are hereby corrected as shown below:

In the heading:

Under "Priority Data"

"21461223" should be --P.2146122.3--

Signed and sealed this 19th day of November 1974.

(SEAL)
Attest:

McCOY M. GIBSON JR.
Attesting Officer

C. MARSHALL DANN
Commissioner of Patents